ically to distress signals, and is especially concerned with automatic dye marking devices for use at sea.

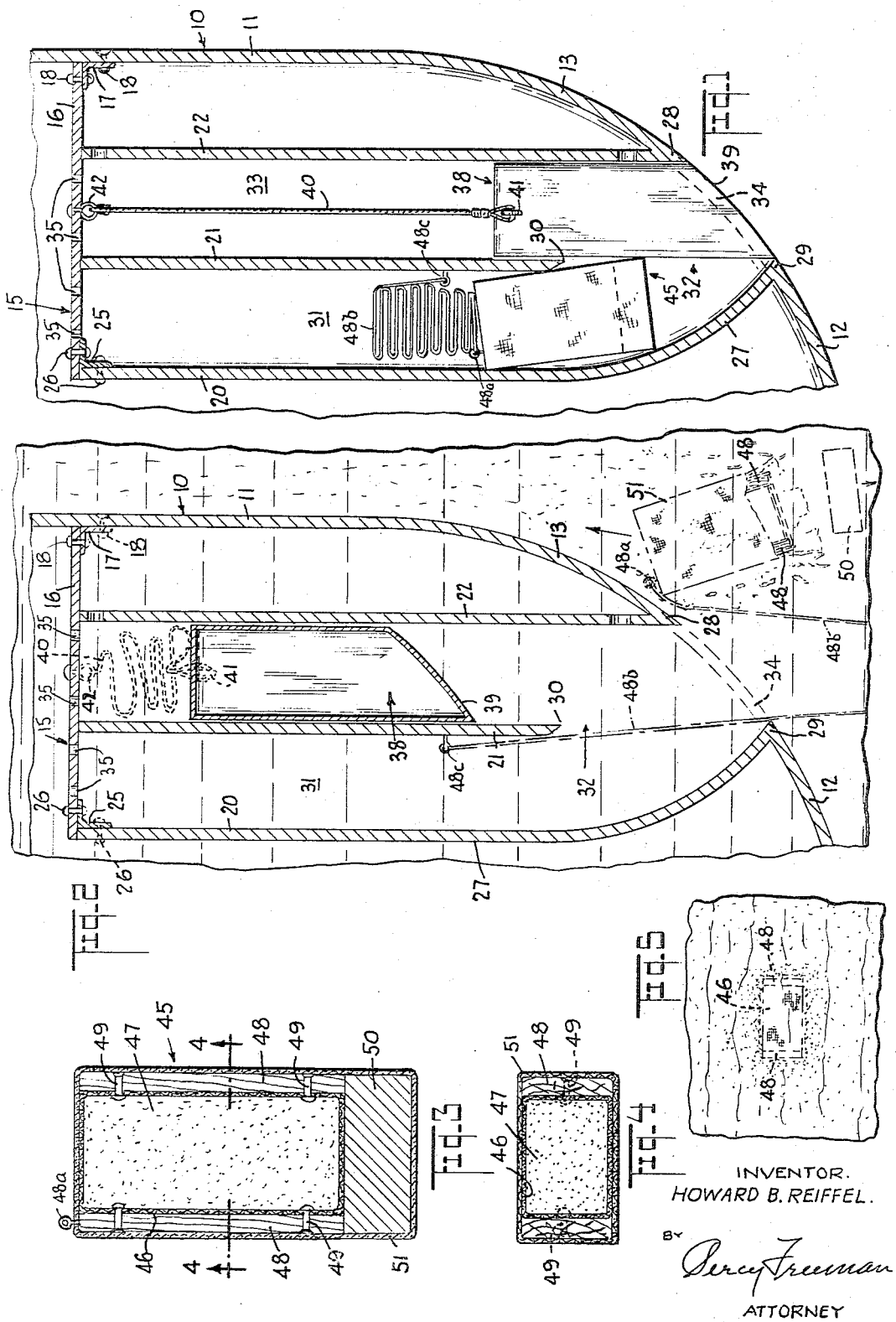

United States Patent Office 3,313,268
Patented Apr. 11, 1967

3,313,268
AUTOMATIC DYE MARKER DEVICE FOR AIRCRAFT
Howard B. Reiffel, Bronxville, N.Y., assignor to Presto Dyechem Co., Inc., a corporation of New York
Filed Oct. 19, 1964, Ser. No. 404,783
6 Claims. (Cl. 116—124)

This invention relates generally to distress signals, and is especially concerned with automatic dye marking devices for use at sea.

It is an important object of the present invention to provide a completely automatic ocean dye marking device for aircraft, whereby a disabled aircraft at sea may be more easily located by rescue parties, which device requires no power from the aircraft power system, or elsewhere, and operates entirely automatically upon the engagement of an aircraft with the sea water, whether by forced landing, crash landing, or other.

It is a further object of the present device to provide an automatic ocean dye marking device for aircraft having the advantageous characteristics mentioned in the preceding paragraph, which is extremely simple in construction, foolproof and reliable in operation, and which can be economically incorporated in an aircraft, requiring little or no maintenance throughout the life of the aircraft.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a partial sectional elevational view of an aircraft, showing an automatic dye marker device of the present invention in a normal inoperative condition.

FIGURE 2 is a partial sectional elevational view similar to FIG. 1, but showing the aircraft in an emergency condition floating on the sea and illustrating operation of the automatic dye marker device.

FIGURE 3 is a longitudinal sectional view taken through a dye marker element of the present invention.

FIGURE 4 is a transverse sectional view taken substantially along the line 4—4 of FIG. 3.

FIGURE 5 is a plan view showing the dye marker element in operative condition in the sea.

Referring now more particularly to the drawings, and specifically to FIGURE 1 thereof, an aircraft is generally designated 10, and the side and bottom walls of the aircraft body are respectively designated 11 and 12. The aircraft side and bottom walls may merge smoothly at the curved wall portion 13.

Interiorly of the aircraft body 10 is located the automatic dye marker device of the present invention, generally designated 15. The device 15 may include a top wall 16 extending generally horizontally inward from the side wall 11, being secured thereto by any suitable means, such as the angle piece 17 and fasteners 18. Depending from the top wall 16 are a plurality of generally upright walls 20, 21 and 22. The innermost wall 20 may be secured at its upper end to the inner edge of the top wall 16, as by angle piece 25 and fasteners 26. From the inner edge of the top wall 16, the inner wall 20 may depend generally vertically, having its lower region 27 curved outwardly and extending to the lower body wall 12 at a meeting edge or corner juncture 29. The outer wall 22 may be generally straight and depend vertically from the top wall 16 to the curved body-wall portion 13, meeting the latter at a juncture 28 spaced outward from the meeting edge or juncture 29 of the inner wall portion 27 and lower body wall 12.

Depending from the top wall 16 in parallel spaced relation between the inner and outer walls 20 and 22 is the intermediate wall 21, which terminates at its lower edge 30 in spaced relation above the wall juncture 29. Thus, the inner and intermediate walls 20 and 21 combine to define a generally vertical passage or guideway 31 having a downward opening 32 between the wall juncture 29 and lower edge 30. Similarly, the intermediate and outer walls 21 and 22 combine to define therebetween a generally vertical passage or guideway 33 having a downward opening 34 between the wall junctures 28 and 29. In order to permit the escape of air upward from the guideways 31 and 33, and the passage of water into the guideways through respective downward openings 32 and 34, the top wall 16 may be provided with a series of through openings or holes 35.

It will now be appreciated that the guideway or passageway 33 extends generally vertically having its lower region extending across the downward opening 32 of guideway 31. Further, the opening 32 of guideway 31 extends both downward and laterally to the downward opening 34 of guideway 33, for purposes appearing presently.

In the normal, ready condition of FIGURE 1, a floatable body or closure 38 is disposed in the passageway 33, being freely movable vertically therein. The closure 38 may assume the form of a hollow tank having its lower end 39 configured for flush relation with the exterior surfaces or aircraft body-wall portions 12 and 13 when the closure is in its lowermost closed position of FIGURE 1. Further, the closure or tank 38 is of sufficient vertical dimension to extend across the opening 32 of guideway 31, in the lowermost, ready position. Sustaining the closure 38 and limiting the latter to the illustrated lowermost position may be a flexible suspension element or cable 40 having its lower end secured by an eye 41 to the closure, and having its upper end secured by an eye 42 to the top wall 16.

Located in the guideway 31 is a marker dye-dispensing package generally designated 45, which is also freely movable vertically in the guideway 31. As seen in FIGURE 1, the closure 38 is in closing relation with respect to the opening 32 of guideway 31, thereby preventing gravitational downward movement of the package 45 outward through the opening 33 and thence through the opening 34. As the closure 38 is floatable, upon submersion of the above-described structure, as in an aircraft landing at sea, the closure 38 floats upward to the position illustrated in FIGURE 2. In this condition, the closure has moved upward beyond the opening 32 and edge 30, leaving the package 45 free to move downward through the opening 32 and then through the opening 34. The package 45 is of sufficient bulk specific gravity so as to be nonfloatable, and, therefore, moves freely downward and outward through the openings 32 and 34 in the condition shown in FIGURE 2.

The particular structure of the package 45 is best seen in FIGURES 3 and 4, there being illustrated as including a generally rectangular container 46 of porous or permeable material and enclosing a quantity of dyestuff 47. Secured to the container 46, as on opposite sides thereof may be flotation bodies 48, as of balsa wood, plastic foam, or other. The flotation 48 may be secured to the container 46 by any suitable means, such as fasteners 49. As thus far described, namely the container 46, contained dyestuff 47, flotation 48 and fasteners 49, the bulk specific gravity of these components is sufficiently low to insure floatability of these components as a unit. Adjacent to the underside of the container 46 and flotation 48 is located a ballast or weight 50. A casing or wrapper 51 envelops the weight 50 and remaining adjacent components 46–49 to secure the entire package 45 together. The size of the weight 50 is such that together with the components 46–49 and casing 51, the entire package has sufficient specific gravity to prevent floating. However, the casing 51, which connects the weight to the remainder of the package, is advantageously fabricated of water-soluble material, so as to dissolve upon contact with water and permit separation of the weight from the remaining components.

This action is seen in FIGURE 2. That is, upon upward movement of the closure 38, the weighted package 45 has passed downward and outward through openings 32 and 34 to a location exteriorly of the aircraft body 10. Upon dissolution of the casing 51, the weight 50 may sink while the casing 46 and its contained dyestuff is caused to float to the surface by the attached flotation 48. By the porous nature of the container 46, the dyestuff 47 dissolves and spreads over the surface of the water in the vicinity of the aircraft, as seen in FIGURE 5, to produce an attention-attracting display.

To insure the retention of the dye package in the vicinity of the aircraft, a flexible tether 48b, of any suitable length, is secured at one end to the dye package 45, as at 48a, the other end of said tether being secured to some fixed part of the aircraft, for instance, to the wall 21 as at 48c.

From the foregoing, it is seen that the present invention provides an automatic dye marker device for aircraft, which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and the scope of the appended claims.

What is claimed is:
1. An ocean dye marking device for aircraft comprising a housing having a first means defining a first guideway having a generally downward first opening, a non-floatable dye-dispensing package movable along said first guideway for gravitational release through said first opening, a second means in said housing defining a second guideway having a generally downward second opening and extending across said first opening in said first guideway, and a floatable closure means freely movable along said second guideway between a lower position blocking said first guideway opening and said second opening and an upper position unblocking said first guideway opening and said second opening whereby submersion of said housing in a liquid medium passes liquid upwardly through said second opening to float said closure means from its blocking position to its unblocking position for gravitational exit from said housing of said package through said first and second openings.

2. An ocean dye marking device for aircraft according to claim 1, said dye-dispensing package comprising a floatable dye dispenser, a weight, and water-soluble connection means securing said weight to said dispenser, whereby submersion of said package effects dissolution of said connection means for release of said dispenser.

3. An ocean dye marking device for aircraft according to claim 2, said dispenser comprising a permeable container, a quantity of dyestuff in said container, and flotation means associated with said container.

4. An ocean dye marking device according to claim 2, said connection means comprising a water-soluble casing about said dispenser and weight.

5. An ocean dye marking device according to claim 1, said second guideway being generally straight, the opening of said first guideway passing downwardly and laterally into said second guideway.

6. An ocean dye marking device for aircraft according to claim 1, in combination with flexible suspension means connected between said second guideway and said closure means and limiting the latter to its lower blocking position.

References Cited by the Examiner
UNITED STATES PATENTS

| | | | |
|---|---|---|---|
| 2,439,598 | 4/1948 | Dinsley | 252—301.3 |
| 2,669,211 | 2/1954 | Linck | 116—124 |
| 2,675,776 | 4/1954 | Tuve | 116—124 |
| 3,043,263 | 7/1962 | Klopp et al. | 116—124 |
| 3,048,464 | 8/1962 | Fisher | 8—79 |
| 3,049,091 | 8/1962 | Carroll et al. | 116—124 |
| 3,280,549 | 10/1966 | Hsu | 9—9 |

LOUIS J. CAPOZI, *Primary Examiner.*